March 6, 1956  H. J. LARSEN  2,736,911
DEVICE HAVING ADHESIVE MASS FOR CLEANING TYPE
OR THE LIKE
Filed April 10, 1950
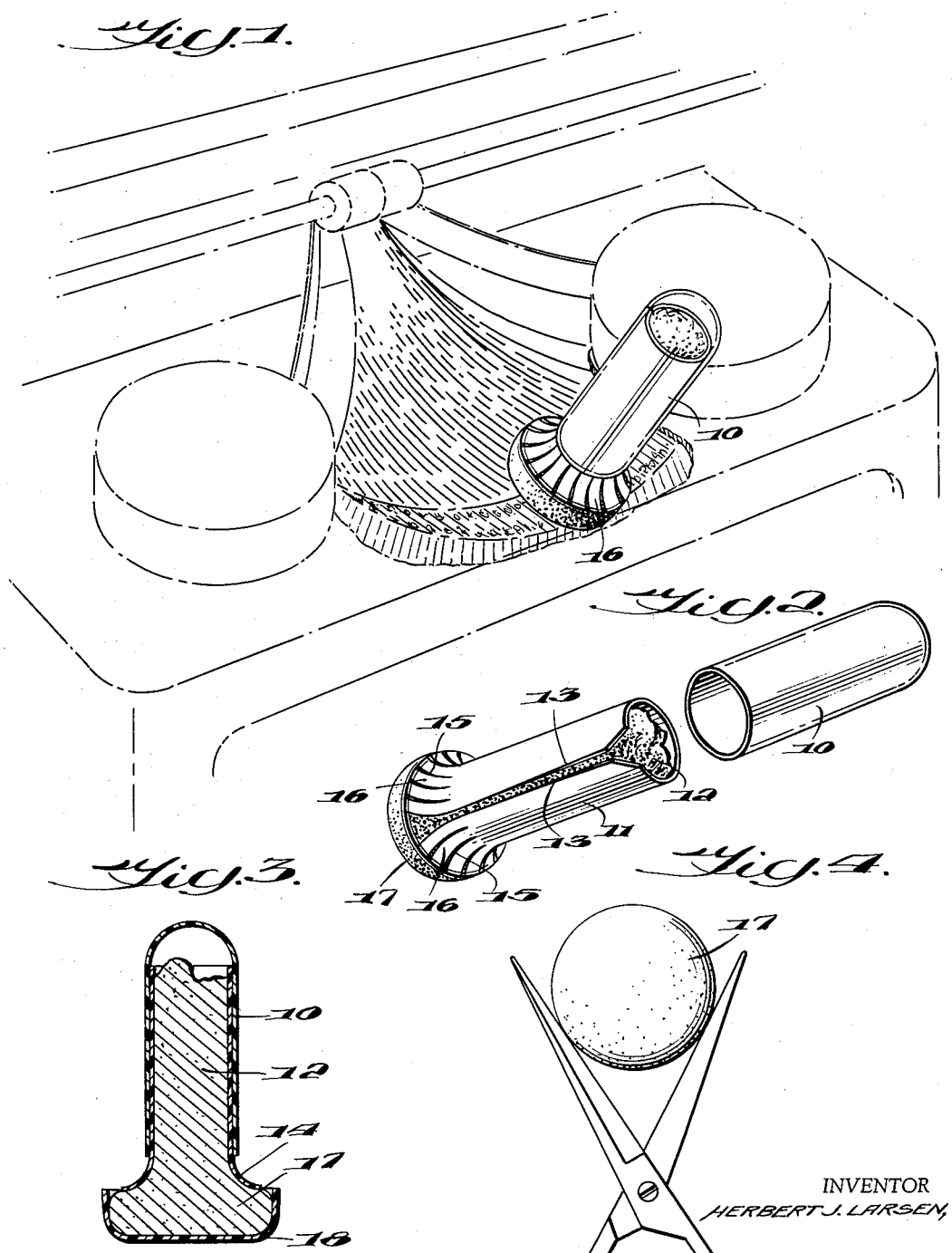
INVENTOR
HERBERT J. LARSEN,
BY Robert B. Larson
ATTORNEY United States Patent Office 2,736,911
Patented Mar. 6, 1956

2,736,911

DEVICE HAVING ADHESIVE MASS FOR CLEANING TYPE OR THE LIKE

Herbert J. Larsen, Chevy Chase, Md., assignor to Bud Type Cleaner, Inc., Baltimore, Md.

Application April 10, 1950, Serial No. 155,008

5 Claims. (Cl. 15—104)

This invention relates to articles useful in cleaning the type of typewriters and the like.

An important object of the invention is to provide an article including a plastic mass which is useful for cleaning typewriter type and which provides a ready means for discarding used plastic material and readying a new supply for use.

A further object of the invention is to provide a cleaning device as referred to above which includes a handy holder and dispenser for the plastic material.

Another object of the invention is the provision of an article as set forth above, which is simple and convenient to use, and cheap to manufacture.

These and other objects of the invention will be apparent from a study of the following specification when read in conjunction with the accompanying drawings, in which:

Fig. 1 is a perspective view showing use of the article in cleaning typewriter type;

Fig. 2 is a perspective view of the article partly disassembled;

Fig. 3 is a longitudinal section through the article with the cap in place; and

Fig. 4 indicates the manner of cutting an end piece from the plastic mass.

Referring now to the drawings, there is shown at 10 a cylindrical case which is closed at one end and open at the other end. This case may be of any suitable material, for example, a transparent plastic material. Inside cylinder 10 is positioned a sheetlike piece of flexible material 11 which may also be transparent plastic material and which is rolled about a plastic mass 12. Piece 11 is dimensioned so that its edges 13 which extend parallel with the axis of the cylinder, either meet or substantially meet when the piece is rolled inside cylinder 10. The dimension of the piece 11 parallel to the axis of the cylinder is somewhat greater than the length of the cylinder 10 so that the piece 11 extends out of the open end of the cylinder a short distance as shown at 14. The extreme end portion of piece 11 as shown at 14 is cut or serrated a short distance in from the end of the piece by a plurality of spaced slits 15 to form a plurality of sections 16.

Inside piece 11 is a mass of plastic material 12 having the characteristic of adhering to ink and other foreign matter collected on the type of a typewriter, as well as collecting other loose foreign material when applied to other surfaces. This mass may be made in accordance with the teachings of U. S. Patent 1,629,862 or may be any other suitable composition. This mass is rolled within the piece 11 as shown, and a portion 17 is left extending from piece 11. The end portion 17 of plastic mass 12 is formed to a generally "mushroom" shape by axial pressure conveniently applied by means of an end cover 18 which is placed over the end of the plastic mass so as to force the end portion of the mass into the mushroom shape and in doing so bend outwardly the sections 16. These sections then support the mushroomed end portion of the plastic mass, and the cap 18 fits closely about the lateral edges of the mushroomed end of the plastic mass and, together with the sections 16 of the piece 11, substantially encloses the mushroomed end of the plastic mass 12.

In use, the plastic mass is rolled within piece 11 so that a portion 17 of the mass extends beyond the serrated end of the piece 11. Piece 11 with the main body of mass 12 rolled therein is then slid into the open end of cylinder 10 with the serrated end of piece 11 extending from the open end of the cylinder. The cap 18 is then pressed on to the end of mass so as to "mushroom" the end, flattening the end of the mass and increasing its diameter. The end edge of cylinder 10 defines the bending line of sections 16. This flattening of the end of the plastic mass bends the sections 16 outwardly and this outward bending causes the sections 16 to support the flattened end of the mass and the outward bending of these sections which is made possible by the spaced slits 15 prevents the end edge of piece 11 from cutting into the flattened end of the mass. This action of sections 16 in bending outwardly is very important to the successful operation of the article, and the provision of the serrated edge forming sections 16 is a very important feature of the invention.

After the end of the mass 12 is "mushroomed," the cap 18 is removed and by gripping the cylinder 10 with the fingers, a person may press the flattened end of mass 12 into the face of the type of a typewriter or other similar device (see Fig. 1) when the mass is pulled away from the type, ink and other foreign matter adhere to the plastic mass and are removed from the type with the plastic mass. By a plurality of such operations, all of the type may be cleaned in a rapid and efficient manner.

When the flattened end of the mass bcomes too dirty to be useful in cleaning type, the material may be renewed by gripping the mushroomed end of the mass and pulling peripheral material of the end portion of the mass around the dirty end of the mass so as to cover up this dirty material with fresh plastic mass. The cap 18 is then pressed again over the end of the mass to mushroom the end of the mass again so as to ready the article for further type cleaning operations.

After one or more cleaning and/or renewing operations as just described, the dirty end of the mass 12 may be eliminated by cutting off the dirty end with scissors or some other cutting instrument as shown in Fig. 4. After this is done, the mass 12 and piece 11 are removed from cylinder 10 and the mass relocated with respect to piece 11 by moving the mass further along piece 11 in an axial direction with respect to the mass and cylinder 10 so as to leave enough of mass 12 extending beyond the edge of piece 11 to permit mushrooming of the end of the mass in the manner just described. After the mass is relocated on piece 11, the piece is again wrapped or rolled about the mass and both are then slid into cylinder 10, and cap 18 is again used to mushroom the end of the plastic mass.

All of the parts which contact plastic mass 12, such as piece 11 and cap 18 are preferably made of a material which does not stick to or adhere to the material of the plastic mass. Such a material is a synthetic plastic of the polyethylene type.

I wish it to be understood that the invention is susceptible of variations from the exact structure and method disclosed herein without departing from the scope of the invention as set forth in the appended claims.

I claim:

1. A cleaning article for removing foreign matter from surfaces comprising a mass of plastic material having the property of adhering to such matter, a generally tubular holder for said mass made of polyethylene plastic, said holder receiving a portion of said mass to leave a portion thereof exposed, said holder including an edge portion serrated to form a plurality of sections, said sections being bent outwardly from the longitudinal axis of said tubular holder to prevent cutting of the edge portion substantially into the exposed portion of the plastic mass and to support the exposed end portion thereof.

2. A cleaning article for removing foreign matter from surfaces comprising a mass of plastic material having the property of adhering to such matter, and a generally tubular holder for said mass, said holder including a tubular outer holder open at at least one end, and a flat, flexible sheet element wrapped about said plastic mass so as to leave an end portion thereof exposed, said element being positioned within said outer holder and movable longitudinally with respect thereto, an edge portion of said element extending beyond the end of said outer holder and bent outwardly from the longitudinal axis of said tubular holder to support the exposed end portion of said plastic mass.

3. A cleaning article for removing foreign matter from surfaces, comprising a mass of plastic material having the property of adhering to such matter, a generally cylindrical holder for said mass, said holder receiving a portion of said mass to leave a portion thereof exposed, said holder including an edge portion adapted to be spread to an increased diameter to support the exposed end portion of said mass, and a circular cap adapted to be placed over the exposed end of said mass to flatten and mushroom the exposed end of the mass and to protect said end portion when the article is not in use, said cap having an end wall and a depending side wall forming an opening slightly larger in diameter than the diameter of said holder edge portion when expanded.

4. A cleaning article for removing foreign matter from surfaces, comprising a mass of plastic material having the property of adhering to such matter, a generally tubular holder for said mass, said holder including a tubular outer holder at least one end of which is open, and a flat flexible sheet element wrapped about said plastic mass so as to leave an end portion thereof exposed, said element being positioned within said outer holder, an edge portion of said element extending beyond the end of said outer holder and serrated to form a plurality of sections, said sections being bent outwardly from the longitudinal axis of said tubular holder to support the exposed end portion of the plastic mass, and a cap adapted to be placed over the exposed end of said mass to flatten and mushroom the exposed end of the mass and to protect said end portion when the article is not in use.

5. A cleaning article for removing foreign matter from surfaces, comprising a mass of plastic material having the property of adhering to such matter, a generally tubular holder for said mass, said holder including a tubular outer holder at least one end of which is open, and a flat flexible element wrapped about said plastic mass so as to leave an end portion thereof exposed, said element being positioned within said outer holder, an edge portion of said element extending beyond the end of said outer holder and serrated to form a plurality of sections, said sections being bent outwardly from the longitudinal axis of said tubular holder to support the exposed end portion of the plastic mass.

References Cited in the file of this patent

UNITED STATES PATENTS

| 1,015,210 | Rowley | Jan. 16, 1912 |
| 1,266,360 | Walters | May 14, 1918 |
| 1,357,060 | Jordan | Oct. 26, 1920 |
| 1,460,607 | Routson | July 3, 1923 |
| 1,629,862 | Faber | May 24, 1927 |
| 1,833,842 | Leonard | Nov. 24, 1931 |
| 2,258,547 | Dodds | Oct. 7, 1941 |
| 2,258,588 | Kenne | Oct. 14, 1941 |
| 2,335,623 | Utterback | Nov. 30, 1943 |

FOREIGN PATENTS

| 710,240 | France | June 1, 1931 |

OTHER REFERENCES

Modern Plastics, February 1948, pp. 73–75.